US010673937B2

(12) United States Patent
Bohling et al.

(10) Patent No.: US 10,673,937 B2
(45) Date of Patent: Jun. 2, 2020

(54) DYNAMIC RECORD-LEVEL SHARING (RLS) PROVISIONING INSIDE A DATA-SHARING SUBSYSTEM (71) Applicant: International Business Machines Corporation, Armonk, NY (US)

(72) Inventors: Neal E. Bohling, San Jose, CA (US); David B. LeGendre, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 14/838,325

(22) Filed: Aug. 27, 2015

(65) Prior Publication Data
US 2017/0063976 A1   Mar. 2, 2017

(51) Int. Cl.
*H04L 29/08* (2006.01)
(52) U.S. Cl.
CPC ...... *H04L 67/1027* (2013.01); *H04L 67/1008* (2013.01)
(58) Field of Classification Search
CPC .................. H04L 67/1027; H04L 67/1008
USPC ........................................................ 709/204
See application file for complete search history.

(56) References Cited

U.S. PATENT DOCUMENTS

| | | | | |
|---|---|---|---|---|
| 6,910,153 B2* | 6/2005 | Kapulka | ............. | G06F 11/0709 711/162 |
| 6,944,787 B2* | 9/2005 | Allen | .................. | G06F 11/2087 709/213 |
| 6,963,917 B1* | 11/2005 | Callis | .................... | G06F 9/5033 709/227 |
| 7,962,615 B1* | 6/2011 | Lehr | ........................ | G06F 9/524 709/224 |
| 8,103,638 B2* | 1/2012 | Voznika | ............ | G06F 17/30486 707/687 |
| 8,301,742 B2 | 10/2012 | Hanson et al. | | |
| 8,996,801 B2* | 3/2015 | Lee | .......................... | G06F 3/061 711/112 |
| 9,544,399 B2* | 1/2017 | Bragstad | ................. | H04L 67/36 |
| 2003/0046396 A1* | 3/2003 | Richter | ................... | G06F 9/505 709/226 |
| 2014/0258446 A1 | 9/2014 | Bursell | | |
| 2015/0082432 A1 | 3/2015 | Eaton et al. | | |
| 2015/0113144 A1 | 4/2015 | Bauer et al. | | |

FOREIGN PATENT DOCUMENTS

CN        104486445 A      4/2015

* cited by examiner

*Primary Examiner* — Kevin T Bates
*Assistant Examiner* — Nazia Naoreen
(74) *Attorney, Agent, or Firm* — Zilka-Kotab, P.C.

(57) ABSTRACT

A computer program product is provided for dynamic record-level sharing (RLS) provisioning. The computer program product comprises a computer readable storage medium having program instructions embodied therewith. The program instructions are executable by a processor to cause the processor to receive, at a local system, a request to access a data set, and determine to ship the request to a receiving system. The program instructions further cause the processor to gather utilization information of at least one other system, and identify, based on the utilization information of the at least one other system, the receiving system from the at least one other system.

18 Claims, 5 Drawing Sheets

DYNAMIC RECORD-LEVEL SHARING (RLS) PROVISIONING INSIDE A DATA-SHARING SUBSYSTEM

BACKGROUND

The present invention relates to data-sharing subsystems, and more specifically, this invention relates to provisioning record-level sharing (RLS) within a data-sharing subsystem.

A primary goal of distributed platforms is to provide efficient resource utilization and high data throughput. During periods of heavy activity of data set access, however, many systems in a cluster may sit idling, while others operate at near, or over, maximum resource capacity. During periods of normal activity of data set access, data set access throughput may needlessly suffer due to a system processing requests for data that the system has not buffered, and that data is already buffered on another system of the cluster. Moreover, on systems with constrained buffering resources, useful buffered data may be disregarded too quickly, while the buffers of other systems go unused.

BRIEF SUMMARY

In one general embodiment, a computer program product is provided for dynamic record-level sharing (RLS) provisioning. The computer program product comprises a computer readable storage medium having program instructions embodied therewith. The program instructions are executable by a processor to cause the processor to receive, at a local system, a request to access a data set, and determine to ship the request to a receiving system. The program instructions further cause the processor to gather utilization information of at least one other system, and identify, based on the utilization information of the at least one other system, the receiving system from the at least one other system.

In another general embodiment, a method is provided for dynamic record-level sharing (RLS) provisioning. The method includes receiving, at a local system, a request to access a data set, and determining to ship the request to a receiving system. The method also includes gathering utilization information of at least one other system, and identifying, based on the utilization information of the at least one other system, the receiving system from the at least one other system.

In another general embodiment, a system comprises a processor and logic integrated with and/or executable by the processor. The logic is configured to receive, at a local system, a request to access a data set, and determine to ship the request to a receiving system. Additionally, the logic is configured to gather utilization information of at least one other system, and identify, based on the utilization information of the at least one other system, the receiving system from the at least one other system.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for dynamic RLS provisioning inside a data-sharing subsystem.

In one general embodiment, a computer program product is provided for dynamic record-level sharing (RLS) provisioning. The computer program product comprises a computer readable storage medium having program instructions embodied therewith. The program instructions are executable by a processor to cause the processor to receive, at a local system, a request to access a data set, and determine to ship the request to a receiving system. The program instructions further cause the processor to gather utilization information of at least one other system, and identify, based on the utilization information of the at least one other system, the receiving system from the at least one other system.

In another general embodiment, a method is provided for dynamic record-level sharing (RLS) provisioning. The method includes receiving, at a local system, a request to access a data set, and determining to ship the request to a receiving system. The method also includes gathering utilization information of at least one other system, and identifying, based on the utilization information of the at least one other system, the receiving system from the at least one other system.

In another general embodiment, a system comprises a processor and logic integrated with and/or executable by the processor. The logic is configured to receive, at a local system, a request to access a data set, and determine to ship the request to a receiving system. Additionally, the logic is configured to gather utilization information of at least one other system, and identify, based on the utilization information of the at least one other system, the receiving system from the at least one other system.

Figure 1:
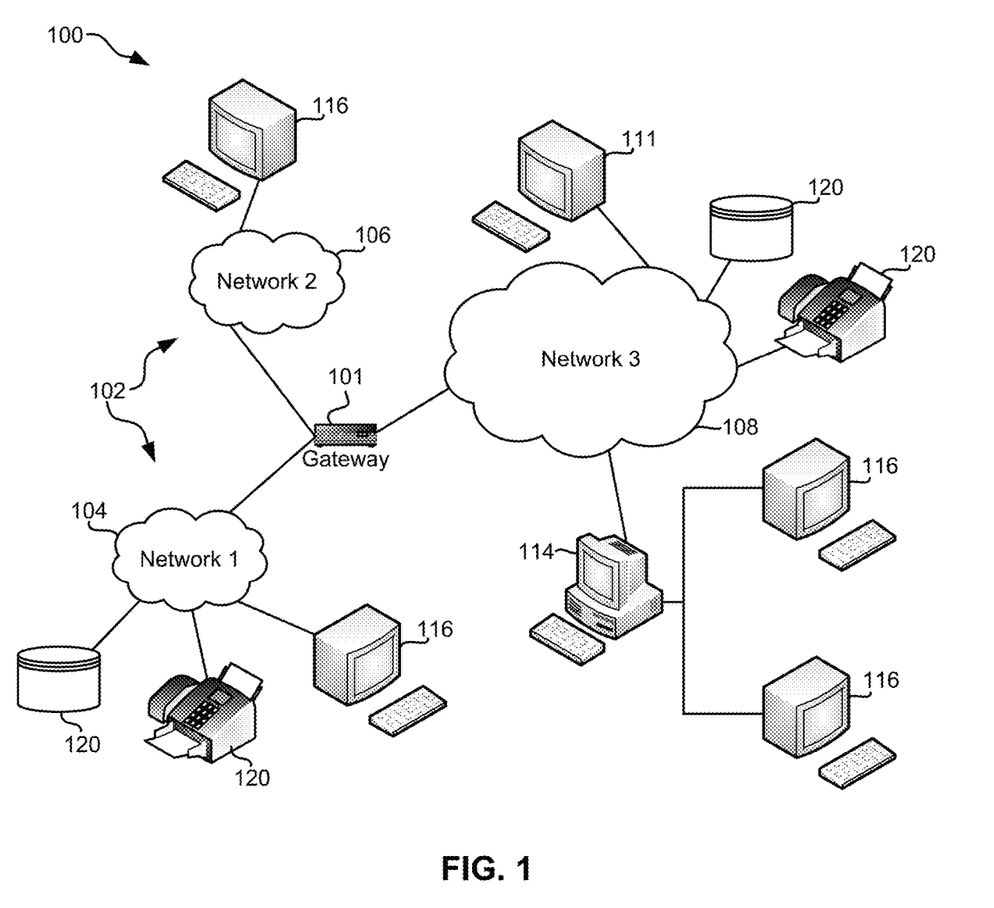
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
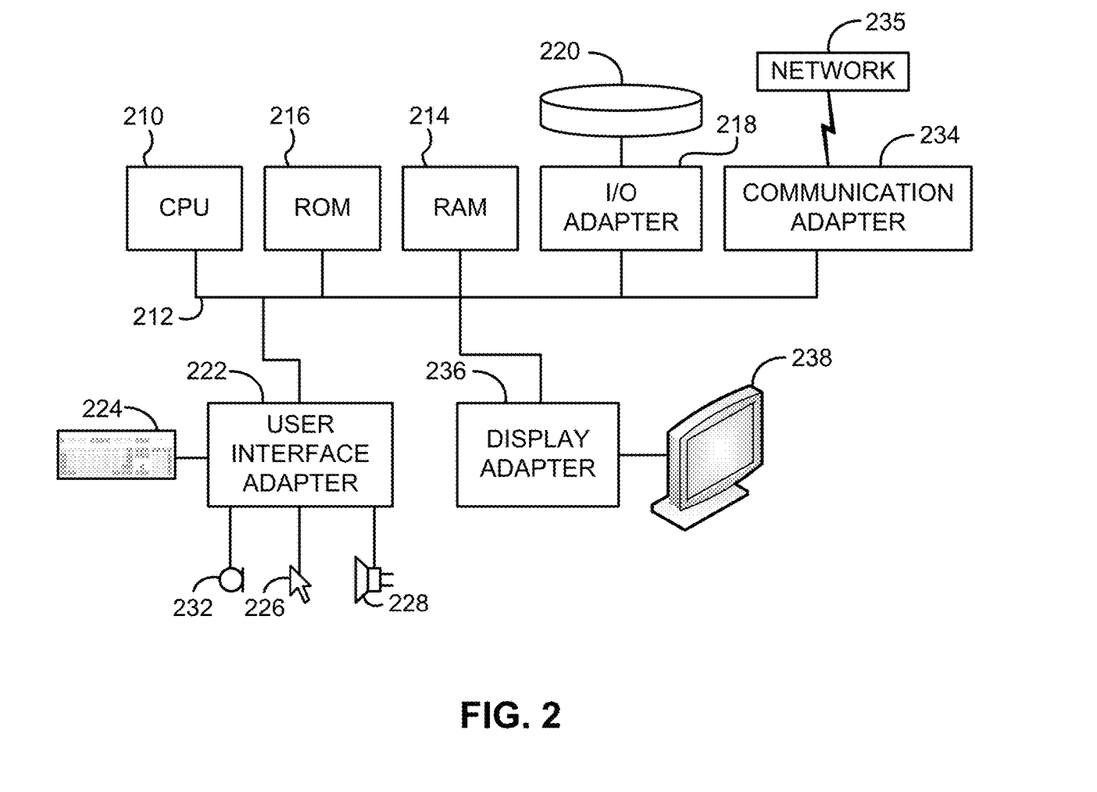
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

Figure 3A:
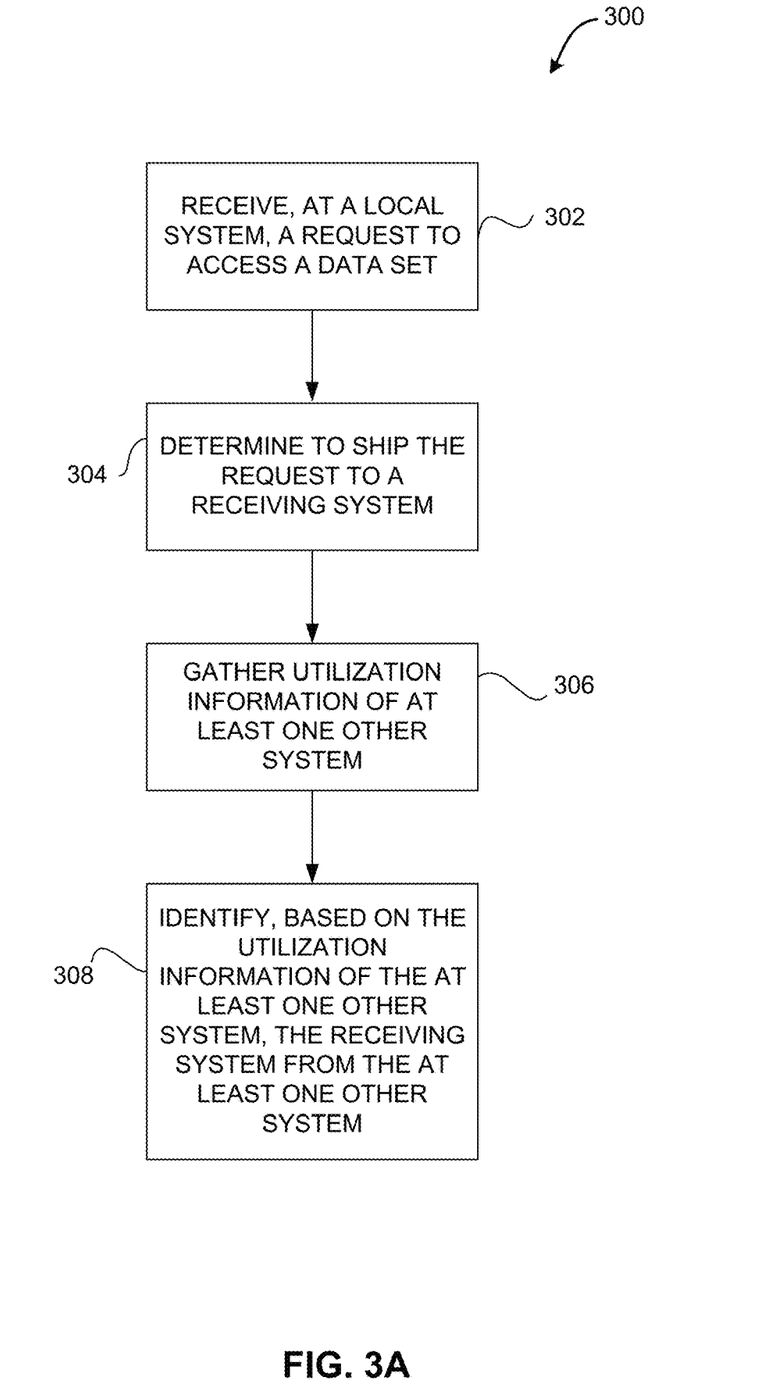
FIG. 3A illustrates a method for dynamic record-level sharing (RLS) provisioning, in accordance with one embodiment.

Now referring to FIG. 3A, a flowchart of a method 300 for dynamic record-level sharing (RLS) provisioning, is shown according to one embodiment. The method 300 may be performed in accordance with the present invention in any of the environments depicted in FIGS. 1-2, among others, in various embodiments. Of course, more or less operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3A, method 300 initiates with operation 302, where a request to access a data set is received at a local system. As used herein, the data set may comprise a file with record organization. Accordingly, the request to access the data set may include a request to read the data set, to write the data set, or to otherwise modify the data set. The request to access the data set may be received from an application, workload, task, user, or client of the local system.

Further, as used herein, the local system may include a server, such as the data server 114 described above in the context of FIG. 1. In various embodiments, the local system may be a member or node of a cluster. In one particular embodiment, the local system is a node of a parallel Sysplex cluster, where the Sysplex cluster includes a plurality of other nodes or systems that are a member of the Sysplex cluster. Deployment of a Sysplex cluster may allow record-level sharing (RLS), such as concurrent read/write access to shared data from all systems in the Sysplex cluster.

Each system of a cluster may concurrently buffer shared data in local processor memory through cluster-wide controls. Consequently, requests associated with a single workload, such as business transactions or database queries, may be dynamically distributed for parallel execution on systems of the cluster based on available processor capacity.

In one embodiment, the access request may be received at a data-sharing subsystem of the local system. In such an embodiment, the data-sharing subsystem may run on its own address space to provide RLS support. For example, in one particular embodiment, the request may be received at an instance of Storage Management Subsystem (SMS) of Virtual Storage Access Method (VSAM) (SMSVSAM) of the local system.

In such an embodiment, SMSVSAM/RLS may internally track details pertaining to data set usage characteristics across multiple subsystems and resources within a Sysplex cluster. RLS may also already track request frequency and duration, buffer success rates, cache hit success rates, I/O throughput, and I/O response times. Accordingly, as described in more detail below, SMSVSAM/RLS may utilize such resource utilization statistics to efficiently make run-time resource allocation decisions.

Next, at operation 304, the local system determines to ship the request to a receiving system. In one embodiment, where the local system is a member of a cluster, the receiving system may include another server that is also a member or node of the cluster. For example, the receiving system may be a node of a Sysplex cluster. Still yet, the determination, to ship the request to the receiving system, may be made by SMSVSAM of the local system. As used herein, shipping the request may include any operation that moves processing of the request to another system, such that the other system then processes the request instead of the local system that received the request at operation 302.

In some embodiments, it may be determined to ship the access request to the receiving system only after first verifying that the data set targeted by the access request is a globally accessible data set. In other words, if an access request targets a data set that is not globally accessible, or otherwise access-limited such that only a subset of systems of a cluster may access the data set, but is accessible to the local system, then the local system may be prevented from shipping the access request to another system.

In one embodiment, the determination to ship the access request to another system may be based on a buffer attribute. For example, if a buffer "least recently used" process is in "Accelerated" mode or "Panic" mode on the local system, then it may be determined to ship the access request from the local system. As another example, the determination to ship the access request to another system may be based on a data-sharing subsystem buffer reclaim rate, which may indicate, for example, how fast a data-sharing subsystem (e.g., SMSVSAM, etc.) is churning through buffers.

In yet another embodiment, the determination to ship the access request to another system may be based on a location of the data set targeted by the request. For example, it may be determined to ship the access request in response to a determination that the data set is not buffered in the local system that received the access request. The data set may be currently buffered by another system other than the local system that received the data access request, and therefore the request may be more efficiently processed by the other system.

In one embodiment, a determination to ship the access request to the receiving system may be made whenever a previously received request for the data set was received by, or forwarded to, another system. In such an embodiment, the data set may remain buffered by the other system, thus it may be more efficient for the other system to execute the request to access the data set.

In one embodiment, one or more thresholds may be associated with resource utilization information of the local system. A user, such as an administrator, may define the thresholds. Accordingly, the determination to ship the access request to the receiving system may be based on a comparison of the resource utilization of the local system to the thresholds. In one particular embodiment, the resource utilization of the local system is compared to the thresholds in response to receiving the data set access request at operation 302. In this manner, the local system may determine whether the access request should be processed locally, or if it should be sent to another system.

Further, resource utilization thresholds may be configured such that the determination to ship the access request is weighted in a manner that prefers processing the request on the local system, unless processing the request on the local system would have an overall negative impact on the cluster. In other words, the resource utilization thresholds may be configured such that the resource utilization of shipping the access request from the local system and executing the access request on the receiving system, does not exceed the resource utilization of simply processing the access request on the local system.

In various embodiments, the resource utilization thresholds may include one or more of a CPU threshold, a buffer threshold, and an average request processing time.

For example, the resource utilization thresholds of the local system may include one or more of: a total or overall CPU threshold (e.g., percentage of total CPU, etc.), a data-sharing subsystem CPU threshold (e.g., percentage of total CPU, MIPS, etc. used by the data-sharing subsystem), a data-sharing subsystem buffer utilization threshold (percentage of total buffer, size in KB, MB, GB, etc. used by the data-sharing subsystem), a data-sharing subsystem latch contention (e.g., percentage of total latch requests, etc.), and an average request time (e.g., in milliseconds, percentage above average, etc.). Still yet, one or more values of the above-noted resource utilization measurements may be combined with historic data to calculate threshold values for point-in-time calculations.

As noted above, in one embodiment, the data-sharing subsystem may include SMSVSAM, such that the data-sharing subsystem CPU threshold includes a percentage of CPU used by SMSVSAM. Further, in another embodiment, the data-sharing subsystem latch contention may include RLS latch contention.

In one embodiment, the local system may determine to ship the access request to the receiving system when total CPU utilization of the local system exceeds a threshold selected from the range of 40-95% CPU utilization (e.g., 50%, 90%, etc.). In another embodiment, the local system may determine to ship the access request to the receiving system when the data-sharing subsystem CPU utilization of the local system exceeds a threshold selected from the range of 10-30% utilization (e.g., 20%, etc.). In yet another embodiment, the local system may determine to ship the access request to the receiving system when the buffer utilization of the local system exceeds a threshold selected from the range of 70-90% utilization (e.g., 80%, etc.). In one embodiment, the local system may determine to ship the access request to the receiving system when latch contention of the local system exceeds a threshold selected from the range of 1-5% contention (e.g., 2% contention, etc.). In another embodiment, the local system may determine to ship the access request to the receiving system when a short-term average request time of the local system exceeds a threshold selected from the range of 130-170% above a long-term average request time (e.g., 150% above average, etc.).

In one embodiment, the resource utilization thresholds may be configured globally, such that the resource utilization thresholds are configured to be the same for each system of a cluster. In another embodiment, the resource utilization thresholds may be configured on a per system basis. In other words, one or more of a CPU threshold, a buffer threshold, and an average request processing time threshold may be specifically configured for a system, and be different than a CPU threshold, a buffer threshold, or an average request processing time threshold, respectively, configured for one or more other systems of the cluster. Per system resource utilization thresholds may be configured when not all systems of a cluster have the same number of CPUs, same buffer size, etc. Accordingly, per system resource utilization thresholds may reflect characteristics of the system the thresholds are configured for.

Additionally, at operation 306, utilization information of at least one other system is gathered. In one embodiment, the at least one other system includes other servers that are a member or node of the cluster that the local system is a member or node of. For example, each of the other systems may be a node of a Sysplex cluster.

Further, the utilization information may include resource availability for each of the systems. For each system, a portion or all of the utilization information of the system may be collected by a component running on the system. In one embodiment, the component may include an RLS statistics subcomponent, such as Measurement Management Facility (MMF).

In various embodiments, each instance of the component may track, for the system it is running on, one or more of: a data-sharing subsystem buffer full percentage, a data-sharing subsystem buffer reclaim rate, data-sharing subsystem latch contention, an overall system CPU utilization, a data-sharing subsystem CPU utilization, a list of data sets buffered on the system, an amount of data buffered on the system, a long-term rolling average for data-sharing subsystem request time (e.g., over 2 hours, 4 hours, 6 hours, 8 hours, etc.), a short-term rolling average for data-sharing subsystem request time (e.g., over 1 minute, 2 minutes, 4 minutes, etc.), a long-term average request time per data set through the data-sharing subsystem, a short-term average request time per data set through the data-sharing subsystem, and an identification of on which system the last request for a given data set was run. As noted above, in a particular embodiment, the data-sharing subsystem may include SMS-VSAM. Using these values, for example, an average request time of a particular SMSVSAM data set may be compared to an average request time of all SMSVSAM data access requests.

Still yet, in another embodiment, the utilization information for each system may identify any data sets that are currently buffered by the system. In such an embodiment, where the utilization information indicates currently buffered data sets, systems of the cluster may avoid duplicating buffer contents between the systems.

The utilization information may be collected at regular intervals. For example, the utilization information may be collected every n milliseconds, seconds, etc.

Still yet, in some embodiments, the utilization information may be stored in one or more locations. For example, the utilization information of the local system may be stored on the local system from which it is gathered (i.e., by the component running on the system that collects the utilization information). Moreover, the utilization information of systems in a cluster may be stored in a global location that is accessible to all systems of the cluster. In one particular embodiment, the utilization information for every system of a cluster may be stored as special locks in a coupling facility lock structure. Utilizing the special locks, any system of the cluster may be able to determine the resource utilization/resource availability of the other systems in the cluster at a given point-in-time.

Accordingly, the utilization information of the at least one other system may be gathered, at operation 306, by polling the global location, such as the special locks in the coupling facility. In this way, the local system may obtain utilization information for a plurality of systems of a cluster. In one embodiment, the utilization information may include SMS-VSAM statistics for each system of a Sysplex cluster.

Further, at operation 308, the receiving system is identified from the at least one other system, based on the utilization information of the at least one other system. In one embodiment, the identification of the receiving system includes selecting the receiving system, from the other systems, for forwarding the request to access the data set.

In some embodiments, the receiving system may be identified by prioritizing the systems of a cluster, and selecting a highest prioritized system. The systems may be prioritized based on a weighting of factors. The weighting of factors may be predetermined. In one embodiment, prioritizing the systems of the cluster may include assigning a prioritization count to each system, and then adding or subtracting from each prioritization count based on resource utilization of the system to which the count is assigned.

For example, a prioritization count may be incremented for a system with the lowest CPU usage. As an option, if a different request was previously received for the data set identified in the access request, and the previous request was sent to another system, then a prioritization count for the other system may be incremented to prioritize the other system within the prioritization of systems. In other words, a system that already has buffered the data set identified in the access request may be prioritized over the other systems. Additionally, a prioritization count may be incremented for a system with the lowest data set request time. Further, a prioritization count may be incremented for a system with the lowest overall request time. Moreover, a prioritization count may be incremented for a system with the lowest latch contention value.

Conversely, a prioritization count for a given system may be decremented when the given system is experiencing high CPU usage (e.g., above other systems of a cluster, above a threshold, etc.), if the data set has not been opened by the given system or is not buffered on the given system, when the given system is experiencing high data set request time (e.g., above other systems of a cluster, above a threshold, etc.), when the given system is experiencing high overall request time (e.g., above other systems of a cluster, above a threshold, etc.), and/or when the given system is experiencing a high latch contention value (e.g., above other systems of a cluster, above a threshold, etc.).

Moreover, after assigning the prioritization counts, and then incrementing and/or decrementing the prioritization counts, the system with the highest prioritization count may be identified as the receiving system.

In one embodiment, the local system may be weighted within the prioritization of the systems. For example, the local system may start with a prioritization count—prior to any incrementing or decrementing of the prioritization counts based on resource utilization—that is greater than the prioritization counts of the other systems. As a specific example, the prioritization count of the local system may be incremented by 1 or 2 prior to any incrementing or decrementing of the prioritization counts based on resource utilization.

By weighting the local system within the prioritization of the systems, shipping of the access request may be prevented when resource utilization is already balanced within a cluster. For example, if the local system that received the access request is currently experiencing buffer utilization of 80%, then it may have been determined that the access request should be shipped to a receiving system. However, if all other systems in the cluster are experiencing similar resource utilization, then shipping the access request may be a less efficient use of resources than simply processing the access request on the local system. In such an example, due to the weighting of the local system, the prioritization of the systems may result in the local system being prioritized the highest. In this manner, the prioritization count may be utilized to avoid shipping the access request to another system when all systems in a cluster are experiencing similar resource utilization.

In one embodiment, after prioritizing the systems, a resource utilization check may be performed on the highest prioritized system. The resource utilization check may determine whether shipping the access request to the highest prioritized system would exceed any resource utilization thresholds configured for the highest prioritized system. If the resource utilization check determines that shipping the access request to the highest prioritized system does not exceed any resource utilization thresholds, then the highest prioritized system may be selected as the receiving system. However, if the resource utilization check determines that shipping the access request to the highest prioritized system does exceed one or more resource utilization thresholds, then the highest prioritized system may be prevented from being selected as the receiving system.

In one embodiment, if the resource utilization check determines that shipping the access request to the highest prioritized system does exceed one or more resource utilization thresholds, then a resource utilization check may be performed on a second highest prioritized system to determine whether shipping the access request to the second highest prioritized system would exceed any resource utilization thresholds configured for the second highest prioritized system. Resource utilization checks may be sequentially performed against the prioritized systems until a suitable receiving system is identified.

In another embodiment, if the resource utilization check determines that shipping the access request to the highest prioritized system does exceed one or more resource utilization thresholds, then shipping of the access request may be prevented, and the access request may be executed at the local system.

In some embodiments, once the receiving system is identified, then the request received at the local system may be shipped to the receiving system. Shipping the request may include any procedure that results in the data set access request being offloaded from the local system to the receiving system.

The request may be shipped in any manner consistent with communications methods utilized in a multi-system environment. In one embodiment, the request may be shipped from the local system to the receiving system via cross-coupling facility (XCF) messaging. In embodiments where the request is received at SMSVSAM of the local system, XCF messaging may already be deployed for communications between systems of a cluster. In this manner, the request may be shipped to a SMSVSAM region on the receiving system.

In one embodiment, a shipping overhead may be tracked. For example, an average may be dynamically tracked, where the average includes an average time difference between executing access requests at a local system that received the access requests, and executing access requests at receiving systems that the access requests are shipped to. Moreover, the shipping overhead may be included in the utilization information, and may be used for identifying a receiving system, or for preventing the shipment of a subsequent access request when it would not be efficient to ship the access request.

After the receiving system receives the access request, the receiving system may execute the access request. Additionally, after executing the access request, the receiving system may return the result of the access request execution to the local system that received the data set access request. The local system may then return the result to the application, workload, task, user, or client that initiated the request.

In some embodiments, the local system may update a record of where the request was executed, such that the record indicates that the request was executed on the receiving system. The record may be stored at the local system, and/or at a global location, such as special locks.

In this manner, the method 300 may increase overall throughput and resource usage efficiency of a cluster by forwarding data set access requests to systems that can most efficiently execute those requests.

Figure 3B:
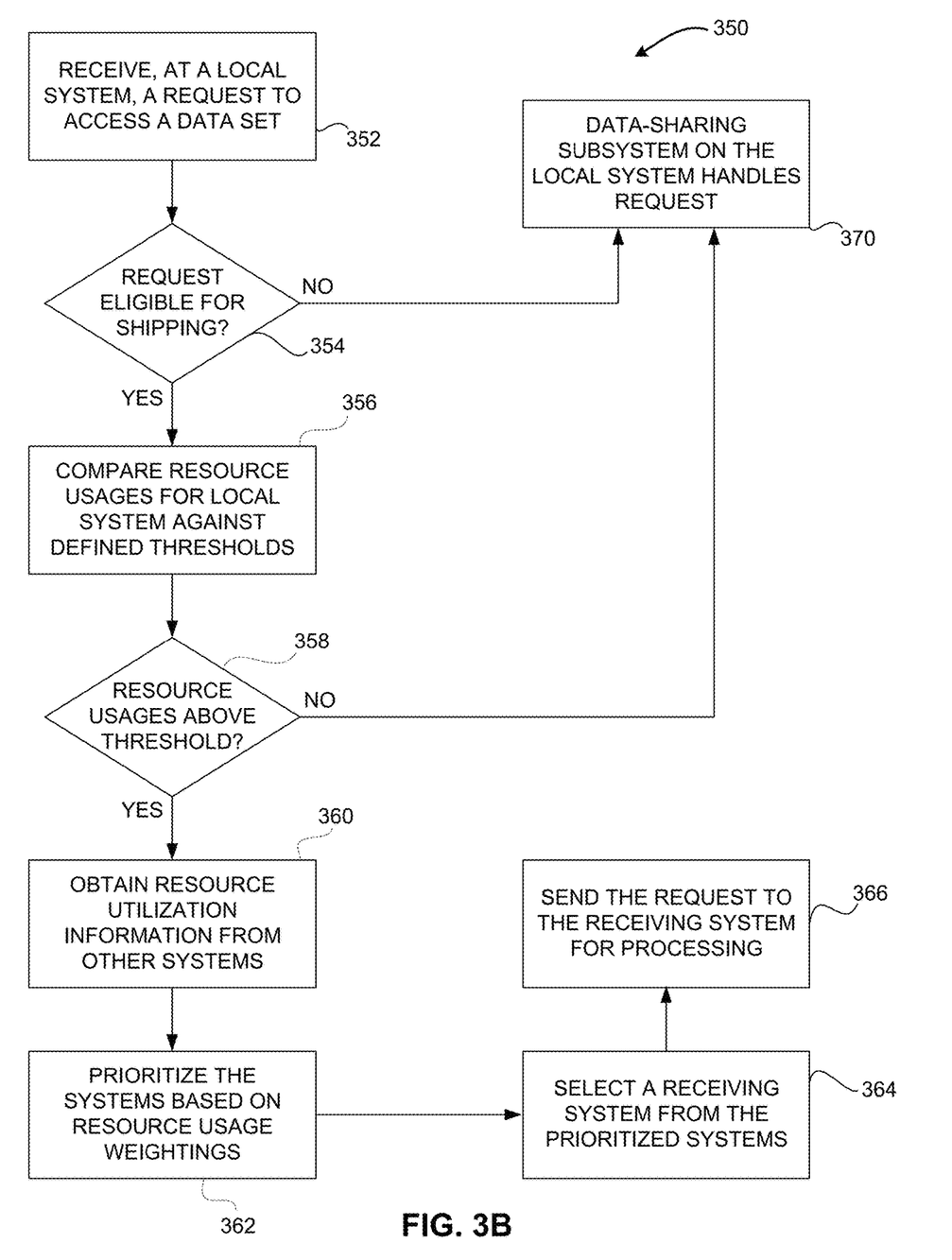
FIG. 3B illustrates a method for dynamic RLS provisioning, in accordance with another embodiment.

Referring now to FIG. 3B, a flowchart of a method 350 for dynamic RLS provisioning, is shown according to one embodiment. The method 350 may be performed in accordance with the present invention in any of the environments depicted in FIGS. 1-2, among others, in various embodiments. Of course, more or less operations than those specifically described in FIG. 3B may be included in method 350, as would be understood by one of skill in the art upon reading the present descriptions.

Each of the steps of the method 350 may be performed by any suitable component of the operating environment. For example, in various embodiments, the method 350 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 350. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3B, method 300 initiates with operation 352, where a request to access a data set is received at a local system. As noted above, the request to access the data set may include a request to read the data set, to write the data set, or to otherwise modify the data set. The request to access the data set may be received from an application, workload, task, user, or client of the local system. Still yet, the access request may be received at a data-sharing subsystem of the local system, such as at an instance of Storage Management Subsystem (SMS) of Virtual Storage Access Method (VSAM) (SMSVSAM) of the local system.

Next, at operation 354, the local system determines whether the access request is eligible for shipping to another system. For example, the access may not be eligible for shipping if the data set targeted by the access request is already open on the local system, only available to the local system, etc. If the access request is not eligible for shipping to another system, then the data-sharing subsystem of the local system handles the access request at operation 370.

However, if the access request is eligible for shipping to another system, then resource usages of the local system are compared against a defined threshold at operation 356. As noted above, one or more thresholds may be associated with resource utilization information of the local system. In various embodiments, the resource utilization threshold may include one or more of a CPU threshold, a buffer threshold, and an average request processing time. Accordingly, it is determined whether resource utilization of the local system is above one or more thresholds at operation 358. If the resource utilization of the local system is not above the resource utilization threshold, then the data-sharing subsystem of the local system handles the access at operation 370.

However, if the resource utilization of the local system is above the resource utilization threshold, then, at operation 360, the local system obtains resource utilization information from other systems. In one embodiment, the other systems include other servers that are a member or node of a cluster that the local system is a member or node of. For example, each of the other systems may be a node of a Sysplex cluster.

Further, the resource utilization information may include resource availability for each of the systems. For example, the resource utilization information may include, for each of the systems, one or more of: a data-sharing subsystem buffer full percentage, a data-sharing subsystem buffer reclaim rate, data-sharing subsystem latch contention, an overall system CPU utilization, a data-sharing subsystem CPU utilization, a list of data sets buffered on the system, an amount of data buffered on the system, a long-term rolling average for data-sharing subsystem request time, a short-term rolling average for data-sharing subsystem request time, a long-term average request time per data set through the data-sharing subsystem, a short-term average request time per data set through the data-sharing subsystem, an identification of on which system the last request for a given data set was run, and currently buffered data sets.

In one embodiment, the resource utilization information of the other systems is obtained by the local system from a global location that is accessible to all systems of the cluster, such as from special locks in a coupling facility lock structure.

At operation 362, the local system prioritizes the systems based on the resource utilization information of the systems. As noted above, prioritizing the systems may include assigning a prioritization count to each system, and then adding or subtracting from each prioritization count based on resource utilization of the system to which the count is assigned. For example, prioritization counts may be adjusted based on CPU usage, buffer usage, where the data set targeted by the request is currently open, data set request time, overall request time, and/or latch contention, etc. In one embodiment, the local system may be weighted within the prioritization of the systems, as discussed above. In another embodiment, the local system may be excluded from the prioritization of the systems, such that only other systems are prioritized.

Further, at operation 364, a receiving system is selected from the prioritized systems. In one embodiment, the receiving system may be identified a highest prioritized system of the system. Moreover, the access request is sent to the receiving system for processing at operation 366. Sending the access request may include any procedure that results in the data set access request being offloaded from the local system to the receiving system, as discussed above.

After the receiving system receives the access request, the receiving system may execute the access request. Additionally, after executing the access request, the receiving system may return the result of the access request execution to the local system that received the data set access request. The local system may then return the result to the application, workload, task, user, or client that initiated the request.

Figure 4:
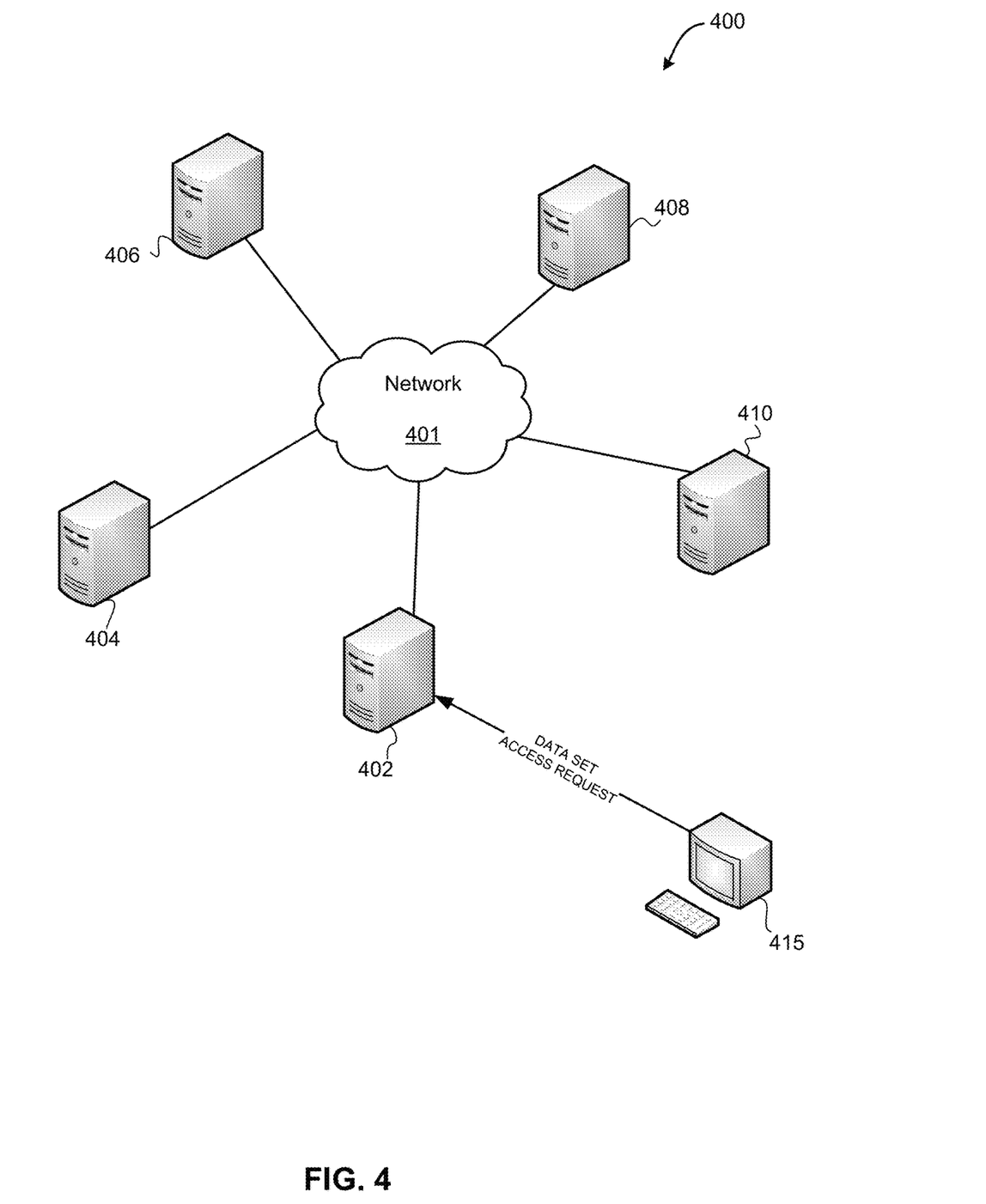
FIG. 4 illustrates a system for dynamic RLS provisioning, in accordance with another embodiment.

FIG. 4 depicts a system 400 for dynamic RLS provisioning, in accordance with one embodiment. As an option, the present system 400 may be implemented in conjunction with features from any other embodiment listed herein, such as those described with reference to the other FIGS. Of course, however, such system 400 and others presented herein may be used in various applications and/or in permutations which may or may not be specifically described in the illustrative embodiments listed herein. Further, the system 400 presented herein may be used in any desired environment.

As shown in FIG. 4, a local system 402 receives a request to access a data set from a client 415. In one embodiment, the request may be received at a data-sharing subsystem of the local system 402. As noted above, the data-sharing subsystem may run on its own address space to provide RLS support. For example, in one particular embodiment, the request may be received at an instance of SMSVSAM of the local system 402.

Further, the local system 402 and the other systems 404, 406, 408, and 410 may together form a cluster, such as a Sysplex cluster. Accordingly, an instance of SMSVSAM may be running on each of the systems 402-410 of the Sysplex cluster. The systems 402-410 are shown communicatively coupled by network 401.

After receiving the access request from the client 415, the local system 402, determines whether to ship the access request to another of the systems 404-410 for processing of the access request by the other system. The determination to ship the access request may be based on a number of different factors.

As a first example, the local system 402 may determine that CPU utilization of the local system 402 is above a predetermined threshold. In particular, total CPU utilization of the local system 402, and/or SMSVSAM CPU utilization of the local system 402 may exceed a predetermined threshold. Consequently, access requests processed on the local system 402 may not complete in a reasonable amount of time (e.g., violate a service-level agreement, etc.). Further, timeouts may invoke retry processing that further complicates matters. Accordingly, in response to determining that CPU utilization of the local system 402 is above the predetermined threshold, the local system 402 may determine to ship the request to a receiving system. This determination may be made by an instance of SMSVSAM on the local system 402.

After determining to ship the request to a receiving system, the local system 402 may gather utilization information, including SMSVSAM statistics, of the systems 404-410 from special locks of a coupling facility. Based on the utilization information, the local system 402 may select a receiving system from the systems 404-410, and ship the request to the receiving system for processing.

As a second example, the local system 402 may determine that the access request from client 415 targets a data set that is already buffered in the cache of another one of the systems 404-410. Accordingly, execution of the access request by the local system 402 may result in unnecessary cache or direct-access storage device (DASD) I/O operations, and such operations may slow execution of requests at the local system 402 while the local system 402 buffers the data set. Further, buffering of the data set at the local system 402 may result in duplicated buffers between two or more of the systems 402-410. Accordingly, in response to determining that the access request from the client 415 targets a data set that is already buffered in the cache of another one of the systems 404-410, the local system 402, may determine to ship the request to a receiving system. This determination may be made by an instance of SMSVSAM on the local system 402.

After determining to ship the access request to a receiving system, the local system 402 may gather utilization information, including SMSVSAM statistics, of the systems 404-410 from special locks of a coupling facility. Based on the utilization information, the local system 402 may determine which of the systems 404-410 has already buffered the data set, identify that system as the receiving system, and ship the access request to the receiving system for processing.

As yet another example, the local system 402 may determine that buffer utilization of the local system 402 is above a predetermined threshold. In particular, SMSVSAM buffer utilization of the local system 402 may exceed a predetermined threshold. Consequently, processing the access request on the local system 402 may require discarding useful buffer data in the SMSVSAM buffer. If data is constantly thrashed in and out of the SMSVSAM buffer due to size constraints, then all SMSVSAM operations on the local system 402 may suffer from slow throughput due to the constant need to re-buffer. Accordingly, in response to determining that buffer utilization of the local system 402 is above a predetermined threshold, the local system 402, may determine to ship the request to a receiving system. This determination may be made by an instance of SMSVSAM on the local system 402.

After determining to ship the request to a receiving system, the local system 402 may gather utilization information, including SMSVSAM statistics, of the systems 404-410 from special locks of a coupling facility. Based on the utilization information, the local system 402 may select a receiving system from the systems 404-410 that has adequate buffer space to process the request, and ship the request to the receiving system for processing.

Accordingly, the methods and systems disclosed above provide a way to monitor local access requests, and distribute those requests around a cluster to complete more quickly and efficiently. In one embodiment, several internal components of SMSVSAM are combined with pre-existing knowledge of a DASD subsystem to determine exactly how, where, and when a given subset of record management activity should be moved between the various participating systems. This may allow a more complete utilization of resources, and a parallelization of processing throughout a given workload.

Distributing a record-level sharing workload and resources to all available systems of a cluster may allow for more effectively using cluster-wide resources. In particular, dynamically provisioning record-level sharing may balance load and resource availability across multiple instances of an application that are spread across multiple systems of a cluster.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for dynamic record-level sharing (RLS) provisioning, the computer program product comprising a computer readable storage medium having program instructions embodied therewith, the program instructions executable by a processor to cause the processor to:
   receive, by the processor at a local system, a request to access a data set stored at a cluster including the local system and a plurality of additional systems;
   compare, by the processor, a resource utilization of the local system to at least one resource utilization threshold;
   process, by the processor, the request at the local system, in response to determining that the resource utilization of the local system does not exceed the at least one resource utilization threshold; and
   in response to determining, by the processor, that the resource utilization of the local system exceeds the at least one resource utilization threshold:
      gather, by the processor, utilization information of each of the plurality of additional systems;
      identify, by the processor, one of the plurality of additional systems, based on the utilization information of each of the plurality of additional systems, including:
         incrementing, by the processor, a prioritization count for one of the plurality of additional systems with a lowest processor usage of the plurality of additional systems,
         incrementing, by the processor, the prioritization count for one of the plurality of additional systems with a lowest overall request time of the plurality of additional systems,
         incrementing, by the processor, the prioritization count for one of the plurality of additional systems with a lowest latch contention value of the plurality of additional systems, and
         identifying, by the processor, the one of the plurality of additional systems as the one of the plurality of additional systems with a highest prioritization count; and
      send, by the processor, the request from the local system to the identified one of the plurality of additional systems.

2. The computer program product of claim 1, wherein the utilization information includes, for a data-sharing subsystem of each of the plurality of additional systems:

a data-sharing subsystem buffer full percentage,
a data-sharing subsystem buffer reclaim rate,
data-sharing subsystem latch contention,
a CPU utilization of the additional system,
a CPU utilization of the data-sharing subsystem,
a list of data sets buffered on the additional system,
an amount of data buffered on the additional system,
a long-term rolling average for data-sharing subsystem request time,
a short-term rolling average for data-sharing subsystem request time,
a long-term average request time per data set through the data-sharing subsystem,
a short-term average request time per data set through the data-sharing subsystem, and
data sets that are currently buffered by the additional system.

3. The computer program product of claim 1, wherein a data-sharing subsystem of the local system includes an instance of Storage Management Subsystem of Virtual Storage Access Method (SMSVSAM) of the local system.

4. The computer program product of claim 1, wherein the resource utilization of the local system includes a buffer reclaim rate of a data-sharing subsystem of the local system.

5. The computer program product of claim 1, wherein the program instructions are executable by the processor to cause the processor to identify, by the processor, one of the plurality of additional systems, based on the utilization information of each of the plurality of additional systems, further includes program instructions executable by the processor to cause the processor to:
decrement, by the processor, a prioritization count for each of the plurality of additional systems with a processor usages above a threshold;
decrement, by the processor, the prioritization count for each of the plurality of additional systems that has not opened or buffered the data set;
decrement, by the processor, the prioritization count for each of the plurality of additional systems with a data set request time above a threshold;
decrement, by the processor, the prioritization count for each of the plurality of additional systems with an overall request time above a threshold;
decrement, by the processor, the prioritization count for each of the plurality of additional systems with a latch contention value above a threshold; and
identify, by the processor, the one of the plurality of additional systems as the one of the plurality of additional systems with a highest prioritization count.

6. The computer program product of claim 1, wherein the program instructions are executable by the processor to cause the processor to:
track an overhead of sending the request from the local system to the identified one of the plurality of additional systems; and
include the overhead in the utilization information.

7. The computer program product of claim 1, wherein the at least one resource utilization threshold includes:
a total CPU threshold,
a CPU threshold of a data-sharing subsystem;
a buffer utilization threshold of the data-sharing subsystem, and
a latch contention threshold of the data-sharing subsystem.

8. The computer program product of claim 1, wherein the at least one resource utilization threshold includes a CPU threshold of a data-sharing subsystem.

9. The computer program product of claim 1, wherein the at least one resource utilization threshold includes a buffer utilization threshold of a data-sharing subsystem.

10. The computer program product of claim 1, wherein the at least one resource utilization threshold includes a latch contention threshold of a data-sharing subsystem.

11. The computer program product of claim 1, wherein the utilization information of the plurality of additional systems is gathered from a global location that is accessible to the local system and the plurality of additional systems.

12. The computer program product of claim 1, wherein the utilization information of the plurality of additional systems is stored as a plurality of locks in a coupling facility lock structure.

13. The computer program product of claim 1, wherein the utilization information of the plurality of additional systems includes SMSVSAM statistics for each system of the plurality of additional systems.

14. The computer program product of claim 1, wherein the identified one of the plurality of additional systems is identified by prioritizing each of the plurality of additional systems utilizing a prioritization count for each of the plurality of additional systems, and selecting a highest prioritized system as the identified one of the plurality of additional systems.

15. The computer program product of claim 14, wherein prioritizing each of the plurality of additional systems includes weighting the local system such that the prioritization count of the local system starts greater than the prioritization counts of the plurality of additional systems.

16. A method for dynamic record-level sharing (RLS) provisioning, the method comprising:
receiving, by a processor at a local system, a request to access a data set stored at a cluster including the local system and a plurality of additional systems;
comparing, by the processor, a resource utilization of the local system to at least one resource utilization threshold;
processing, by the processor, the request at the local system, in response to determining that the resource utilization of the local system does not exceed the at least one resource utilization threshold; and
in response to determining, by the processor, that the resource utilization of the local system exceeds the at least one resource utilization threshold:
gathering, by the processor, utilization information of each of the plurality of additional systems;
identifying, by the processor, one of the plurality of additional systems, based on the utilization information of each of the plurality of additional systems, including:
incrementing, by the processor, a prioritization count for one of the plurality of additional systems with a lowest processor usage of the plurality of additional systems,
incrementing, by the processor, the prioritization count for one of the plurality of additional systems with a lowest overall request time of the plurality of additional systems,
incrementing, by the processor, the prioritization count for one of the plurality of additional systems with a lowest latch contention value of the plurality of additional systems, and
identifying, by the processor, the one of the plurality of additional systems as the one of the plurality of additional systems with a highest prioritization count; and sending, by the processor, the request from the local system to the identified one of the plurality of additional systems.

17. The method of claim 16, wherein the request is received at a data-sharing subsystem of the local system.

18. A system, comprising:
a processor and logic integrated with the processor, executable by the processor, or integrated with and executable by the processor, the logic being configured to:
receive, at a local system, a request to access a data set stored at a cluster including the local system and a plurality of additional systems;
compare a resource utilization of the local system to at least one resource utilization threshold;
process the request at the local system, in response to determining that the resource utilization of the local system does not exceed the at least one resource utilization threshold; and
in response to determining that the resource utilization of the local system exceeds the at least one resource utilization threshold:
gather utilization information of each of the plurality of additional systems;
identify one of the plurality of additional systems, based on the utilization information of each of the plurality of additional systems, including:
incrementing a prioritization count for one of the plurality of additional systems with a lowest processor usage of the plurality of additional systems,
incrementing the prioritization count for one of the plurality of additional systems with a lowest overall request time of the plurality of additional systems,
incrementing the prioritization count for one of the plurality of additional systems with a lowest latch contention value of the plurality of additional systems, and
identifying the one of the plurality of additional systems as the one of the plurality of additional systems with a highest prioritization count; and
send the request from the local system to the identified one of the plurality of additional systems.

* * * * *